United States Patent

Mosley et al.

[15] 3,701,986
[45] Oct. 31, 1972

[54] ALERT-GUARD

[72] Inventors: Sterling Mosley; Hosea Jackson, both of 1408 Magnolia Street, North Little Rock, Ark. 72114

[22] Filed: July 31, 1967

[21] Appl. No.: 657,267

[52] U.S. Cl. ................................................340/279
[51] Int. Cl. ............................................G08b 21/00
[58] Field of Search ................340/279, 265; 200/48

[56] References Cited

UNITED STATES PATENTS 2,738,496    3/1956    Armstrong.................340/279

3,054,868    9/1962    Phillians................340/279 X

FOREIGN PATENTS OR APPLICATIONS 174,503    3/1961    Sweden.....................200/48

*Primary Examiner*—John W. Caldwell
*Assistant Examiner*—Perry Palan

[57] ABSTRACT

A warning signal device for motorists to alert a driver, who is starting to fall asleep, the device including a telescoping rod that would activate a buzzer or other alarm connected in an electrical circuit.

2 Claims, 4 Drawing Figures

PATENTED OCT 31 1972    3,701,986

INVENTORS
STERLING MOSLEY
and HOSEA JACKSON

ALERT-GUARD

This invention relates generally to warning signal devices. More specifically it relates to devices to alert an automobile or truck driver from falling asleep.

It is generally well known that a great many of highway accidents occur because a driver of a vehicle has fallen asleep at the wheel. This is particularly very dangerous when there is no other passenger alongside to awaken the driver or seize the wheel himself before the vehicle leaves the right of way. Heretofor various methods have been adapted to prevent a driver from falling asleep, particularly the use of stimulant pills, however some drivers are allergic to such drugs, and accordingly cannot use them to keep awake behind a wheel. Other methods likewise have not been effective and thus have not become adapted.

Accordingly, it is a principal object of the present invention to provide an alert guard warning signal device for an automotive vehicle and which has improved self-contained means to prevent a driver from falling asleep while at the controls of the vehicle.

Another object is to provide an alert guard that becomes automatically activated by the usual behavior of a person beginning to doze or fall asleep, such behavior generally comprising the person's change in attitude by slumping forwardly.

Yet another object is to provide an alert guard wherein the forward slumping of a driver's head will cause a circuit to close to a buzzer making a loud sound so to instantly revive the drousing driver to a fully conscious state.

Yet a further object is to provide an alert guard which will produce an audible sound when the driver's head slumps forwardly, the sound being clearly heard throughout the vehicle interior so that if any passenger is present, they will instantly become awake that the driver is sleepy and should be relieved at the wheel by another person taking over, or at least suggest to the driver to pull over to the highway shoulder and rest.

Other objects are to provide an alert guard which is simple in design, inexpensive to manufacture, rugged in construction, easy to use and efficient in operation.

These and other objects will be readily evident upon a study of the following specification and the accompanying drawing wherein.

Figure 1:
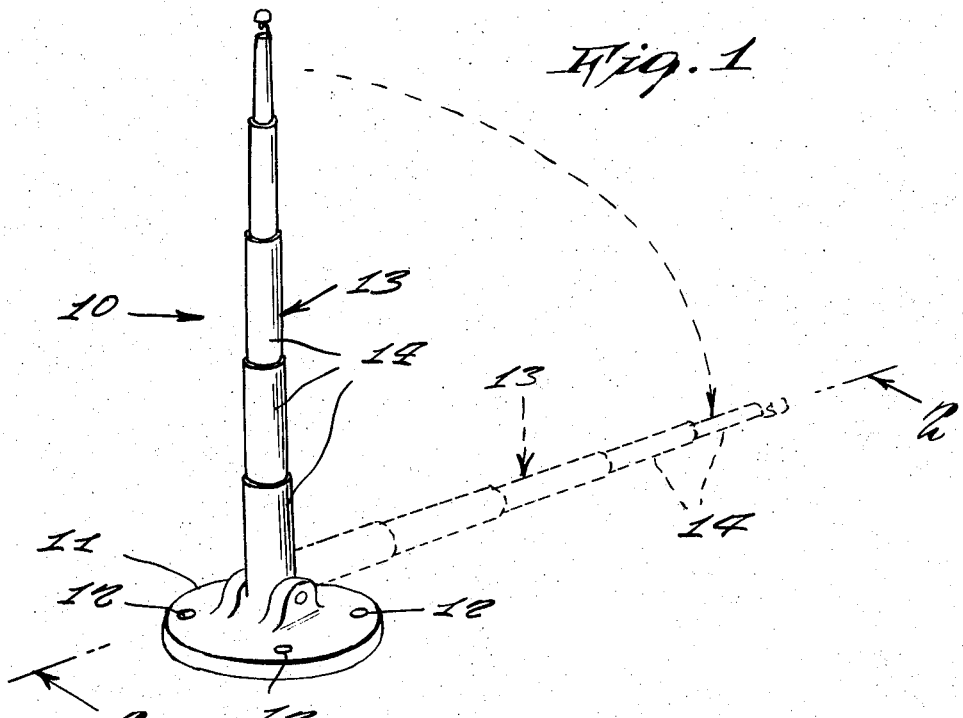
FIG. 1 is a perspective view of the invention.
Figure 2:
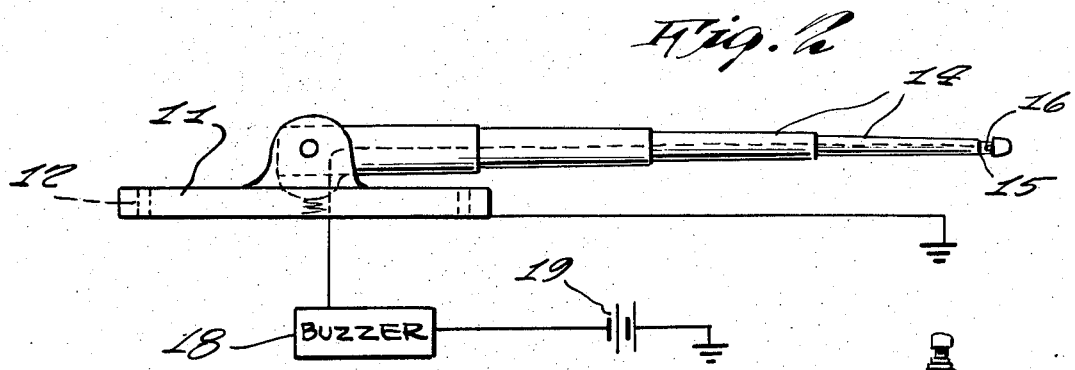
FIG. 2 is a side view thereof shown in electrical circuit with a buzzer.
Figure 3:
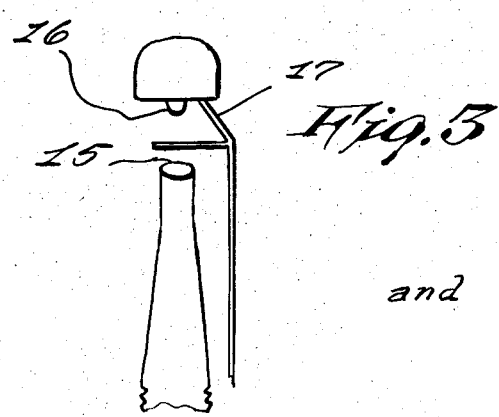
FIG. 3 is an enlarged view of the electrical contact elements.

Referring now to the drawing in detail, the reference numeral 10 represents an alert guard according to the present invention wherein there is a base 11 having mounting openings 12 for receiving screws (not shown) so to secure the device on a windshield post of an automotive vehicle; the windshield being located near the driver's side.

A telescoping rod 13, comprised of a plurality of intersliding sections 14 is mounted at one end on the base 11. At the opposite end of the rod there are a pair of normally spaced apart contacts 15 and 16; the latter being supported on a very sensitively flexible support 17 which upon even a slight contact will cause the same to displace and touch the other contact is rigidly secured on the rod end.

Figure 4:
FIG. 4 is a side view of the device in a collapsed non-operative position.

When not in use, the device 10 is in retracted position as shown in FIG. 4. When the driver becomes aware that he is possibly getting sleepy, he extends the rod into a path into which his head would possibly slump if he should start to doze. Should he then start to fall asleep, his head would begin to slump and contact the rod thus disturbing the position of contact 16 which would move to engage contact 15 thus closing electrical circuit 17 containing buzzer 18 and the automobile battery 19. The buzzing sound would revive the driver from his decreasingly conscious state.

It is to be noted that the sensitive switch means in the head of the rod can be so constructed that an adjustable elastic collar can be placed around the neck mounted on the switch in the rod, so when the head falls forward, it would kick the buzzer.

It is to be further noted that the telescopic rod could also be fixed, so that when the rod is alerted, the automatic blinker would come on, thus warning the drivers of other vehicles so that they will drive defensively while trying to aid the driver, knowing that he is in danger.

While various changes may be made in the detail construction; it is understood that such changes will be within the spirit and scope of the invention.

Having thus set forth and disclosed the nature of this invention, what is claimed is:

1. A sleep restraining device for vehicle drivers comprising an extensible rod having telescoping sections mounted on a support base, including an electric contact resiliently mounted on the outermost section in axial alignment with the rod and extending externally therefrom in combination with a second contact mounted axially within the outermost section spaced from and adjacent the first said contact, said contacts being part of a normally open electric circuit including electric power means and audible signal, whereby the first said contact means will engage the second contact upon predetermined motion of the driver.

2. A device as in claim 1 wherein the rod is pivotably mounted on the base.

* * * * *